(12) United States Patent
Savicki, Jr. et al.

(10) Patent No.: US 11,923,641 B2
(45) Date of Patent: *Mar. 5, 2024

(54) ELECTRICAL WIRING DEVICE WITH FLEXIBLE TERMINAL FOR ELIMINATING CONNECTION TO GROUND

(71) Applicant: Pass & Seymour, Inc., Syracuse, NY (US)

(72) Inventors: Gerald R. Savicki, Jr., Canastota, NY (US); Syed J. Jamal, Rochester, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,884

(22) Filed: Jul. 12, 2022

(65) Prior Publication Data

US 2023/0006398 A1 Jan. 5, 2023

Related U.S. Application Data

(63) Continuation of application No. 16/992,715, filed on Aug. 13, 2020, now Pat. No. 11,387,608.
(Continued)

(51) Int. Cl.
*H01R 13/652* (2006.01)
*H01R 4/30* (2006.01)
*H01R 4/36* (2006.01)

(52) U.S. Cl.
CPC .......... *H01R 13/652* (2013.01); *H01R 4/304* (2013.01); *H01R 4/305* (2013.01); *H01R 4/363* (2013.01)

(58) Field of Classification Search
CPC ... H01R 3/04; H01R 3/06; H01R 4/24; H01R 4/2445; H01R 4/44; H01R 4/304; H01R 4/305; H01R 4/363; H01R 4/64; H01R 4/66; H01R 9/14; H01R 13/652; H01R 13/648; H01R 13/73; H01R 13/74; H01R 13/713; H01R 13/741; H01R 13/745;
(Continued)

(56) References Cited

U.S. PATENT DOCUMENTS 3,021,581 A * 2/1962 Cook ................... H01R 4/4809
24/561
3,486,158 A * 12/1969 Soltysik ............... H01R 12/714
439/444
(Continued)

*Primary Examiner* — William H. Mayo, III
(74) *Attorney, Agent, or Firm* — Bond, Schoeneck & King, PLLC; Frederick J.M. Price

(57) ABSTRACT

An electrical wiring system providing selectable referencing to earth ground having a housing comprising a first terminal for attachment to HOT, a second terminal for attachment to LOAD, and a flexible terminal comprising a first leg mounted to the electrical wiring device and a second leg connected to the first leg via a flexible joint, wherein the relative distance between the first leg and the second leg is adjustable between an extended position and a retracted position by flexing the flexible joint, the flexible joint being biased in the extended position, wherein the first leg defines a first aperture and the second leg defines a second aperture, and a load control circuit disposed within the housing and receiving a line input from the first terminal and a reference input, the reference input being referenced to the electric potential of the flexible terminal.

15 Claims, 18 Drawing Sheets

Related U.S. Application Data

(60) Provisional application No. 62/886,048, filed on Aug. 13, 2019.

(58) Field of Classification Search
CPC . H01R 4/00; H01R 13/00; H01H 9/12; H01H 11/0018; H05K 5/02; H02G 3/16
USPC .... 439/92, 95, 107, 409, 412, 417, 650–654
See application file for complete search history.

(56) References Cited

U.S. PATENT DOCUMENTS

| | | | | |
|---|---|---|---|---|
| 3,680,031 A * | 7/1972 | Schumacher | ........ | H01R 13/648 439/538 |
| 4,040,700 A * | 8/1977 | Obuch | ...................... | H01R 4/34 439/431 |
| 4,186,981 A * | 2/1980 | Holton | ...................... | H01R 4/64 439/786 |
| 4,456,321 A * | 6/1984 | Jones | ................... | H01R 4/2445 439/395 |
| 4,738,634 A * | 4/1988 | Taylor | ...................... | H02G 3/16 439/441 |
| 4,761,525 A * | 8/1988 | Stumpff | ............... | H01H 1/5844 200/558 |
| 5,044,979 A * | 9/1991 | Siemon | ................ | H01R 4/2429 439/724 |
| 5,218,760 A * | 6/1993 | Colton | ................... | G06F 1/183 439/55 |
| 5,532,669 A * | 7/1996 | Tsunezawa | .............. | H01C 1/14 338/276 |
| 5,759,004 A * | 6/1998 | Kuffel | ...................... | H02G 3/30 24/295 |
| 5,919,019 A * | 7/1999 | Fischer | ................. | F16B 37/043 411/177 |
| 6,017,226 A * | 1/2000 | Jeffries | ................... | H05K 7/142 361/679.6 |
| 6,095,848 A * | 8/2000 | Munshi | ................ | H01R 25/006 439/417 |
| 6,102,713 A * | 8/2000 | Todd, Jr. | ................ | H01R 24/78 439/107 |
| 6,267,607 B1 * | 7/2001 | Fitch | .................. | H01R 13/6485 439/108 |
| 6,313,403 B1 * | 11/2001 | Livingston | ............... | H01H 9/12 174/53 |
| 6,751,102 B1 * | 6/2004 | Chen | ....................... | G06F 1/184 361/759 |
| 6,908,274 B1 * | 6/2005 | Vassiliou | ................ | F16B 37/043 411/173 |
| 6,986,673 B2 * | 1/2006 | de la Borbolla | ......... | H01R 4/66 439/100 |
| 8,848,396 B2 * | 9/2014 | Wang | ..................... | H05K 7/142 361/759 |
| 9,301,410 B2 * | 3/2016 | Rohmer | ................ | H01H 13/22 |
| 9,638,231 B2 * | 5/2017 | Mo | ....................... | F16B 21/186 |
| 2013/0106287 A1 * | 5/2013 | Savicki, Jr. | ........ | H01H 11/0018 315/113 |
| 2018/0316307 A1 * | 11/2018 | Martin | ..................... | F16B 2/12 |

\* cited by examiner

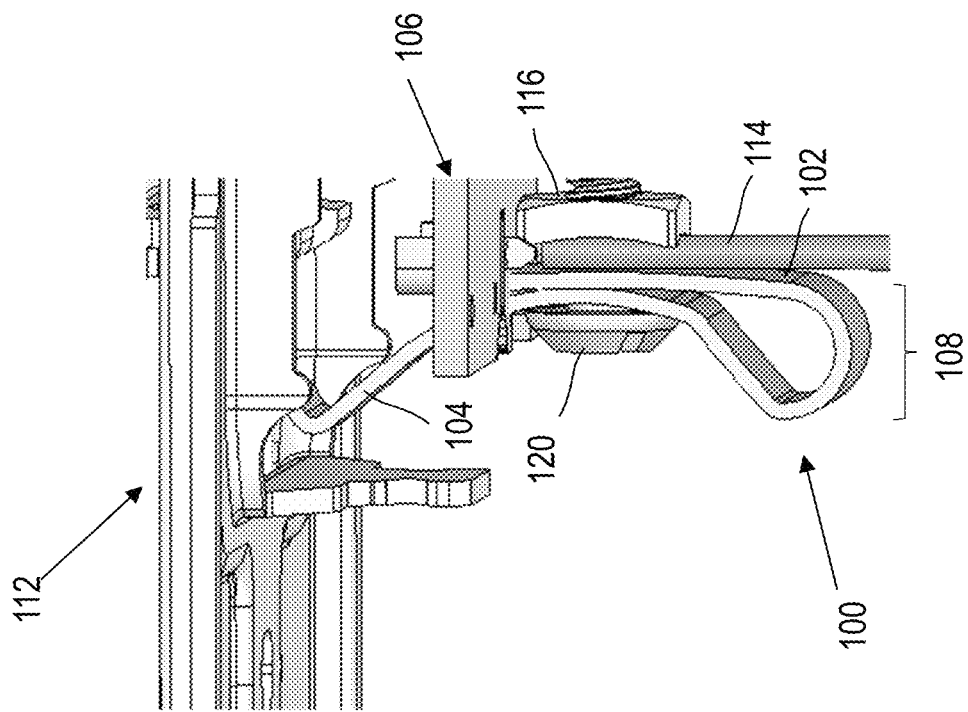
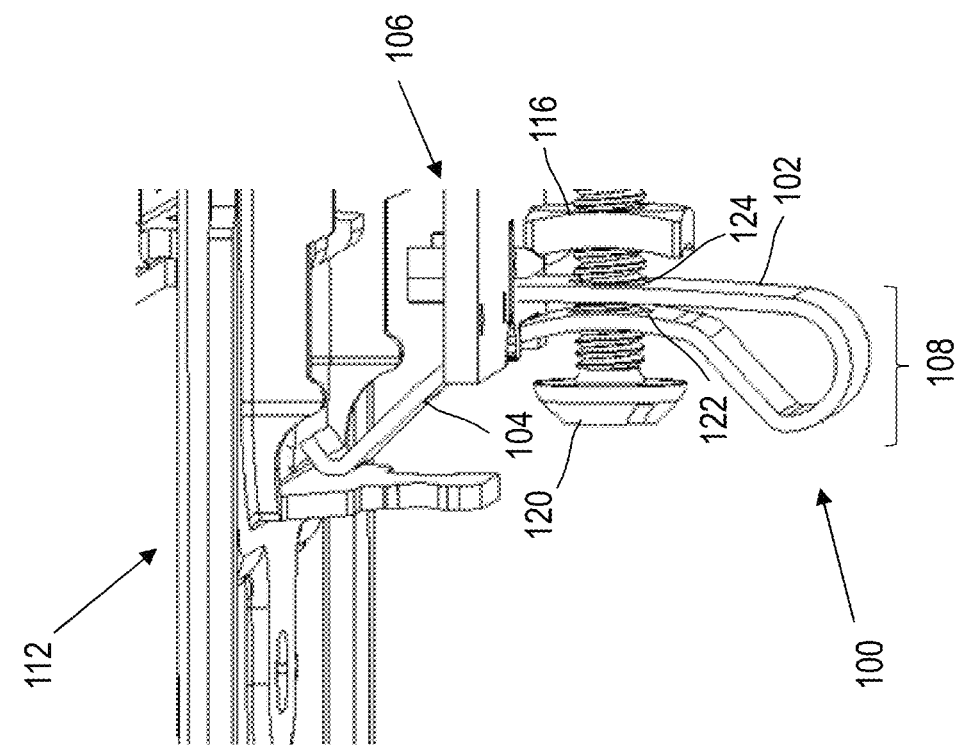

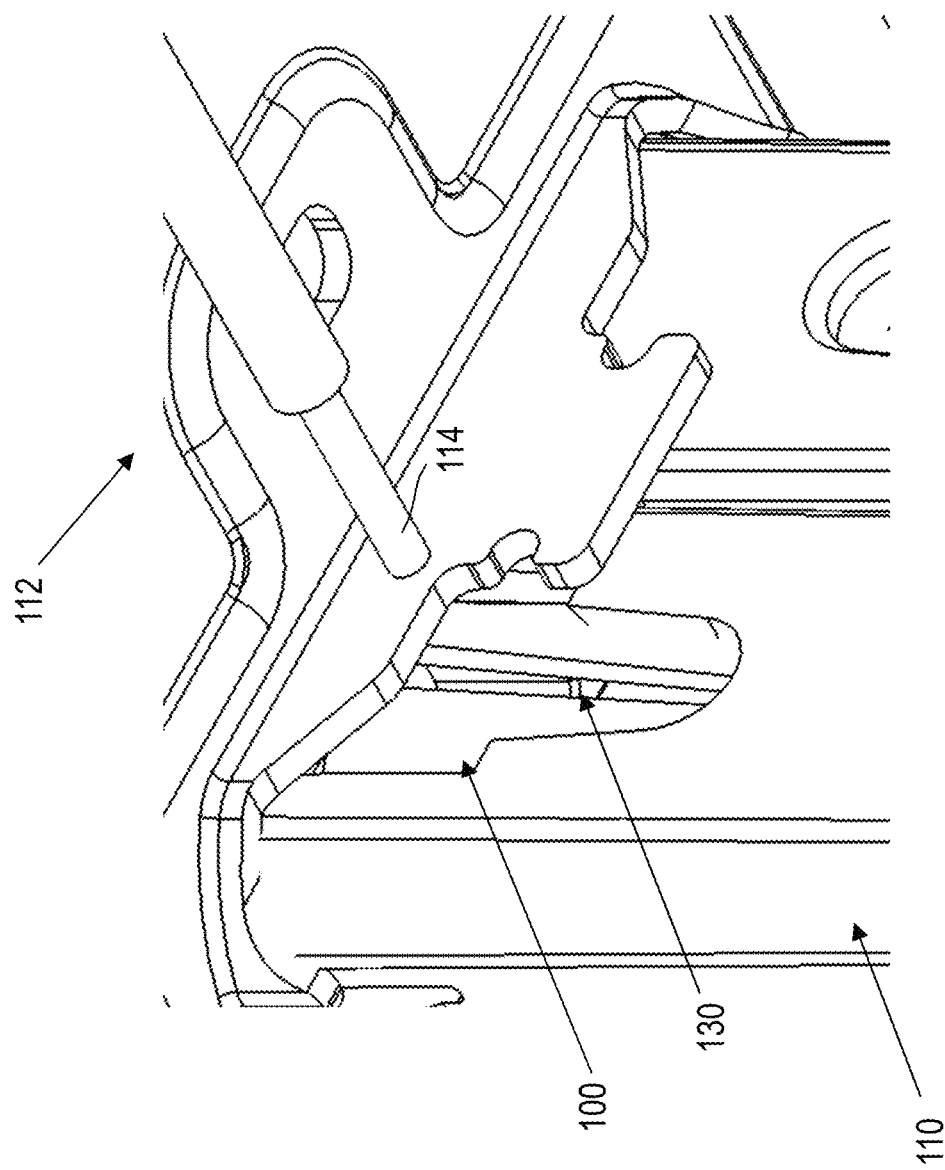

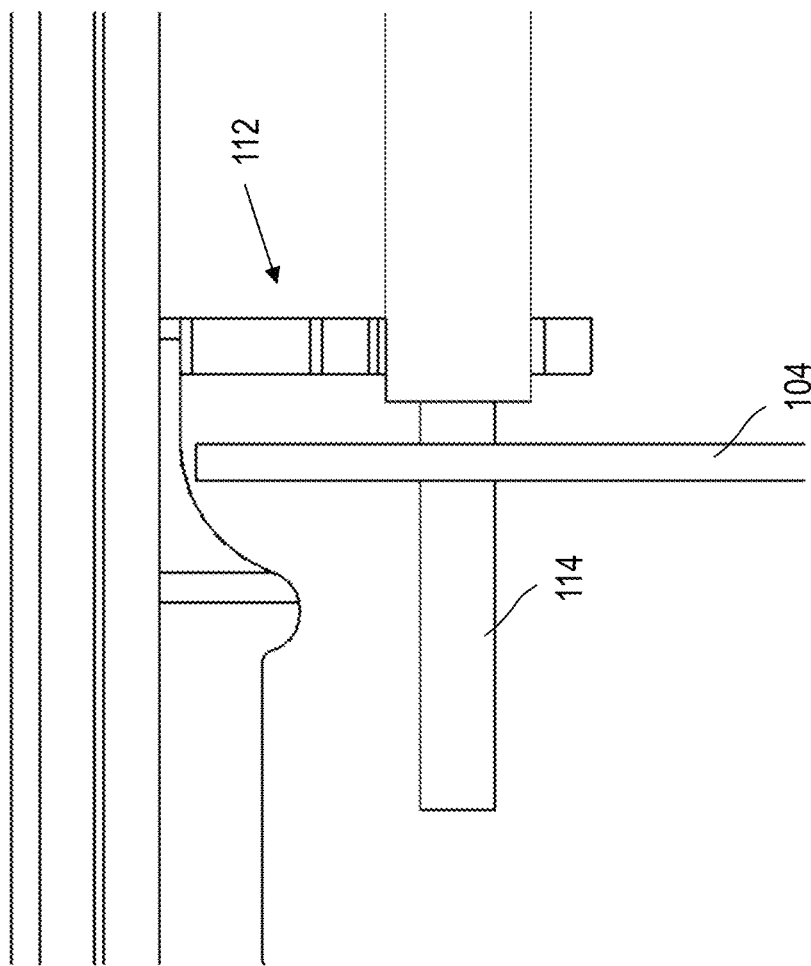

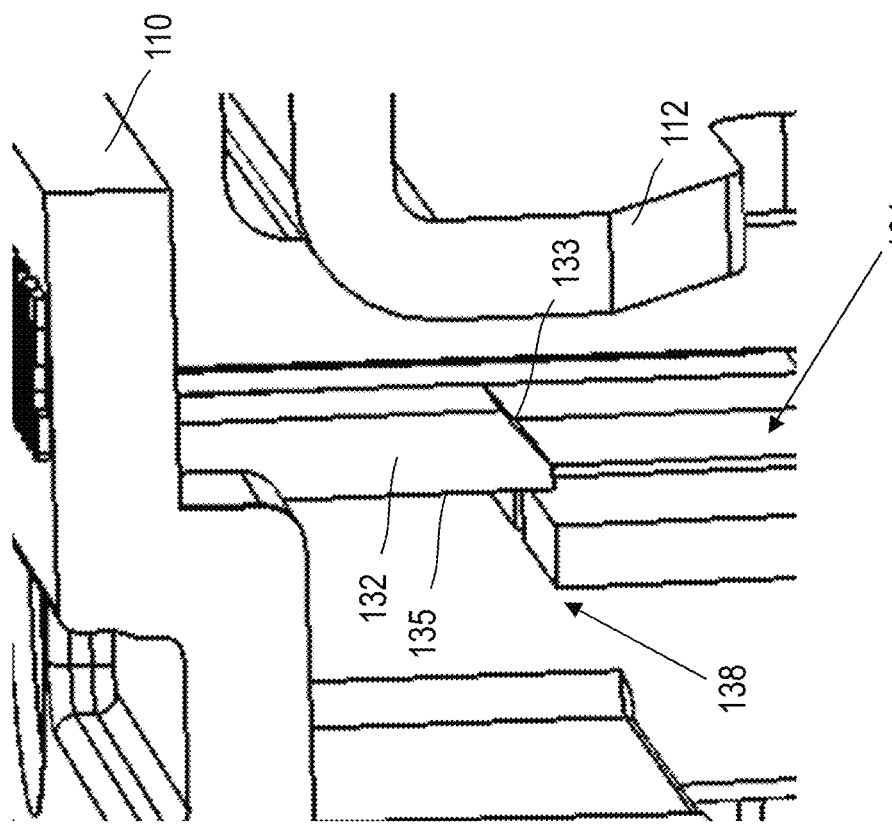

ELECTRICAL WIRING DEVICE WITH FLEXIBLE TERMINAL FOR ELIMINATING CONNECTION TO GROUND

CROSS REFERENCE TO RELATED APPLICATIONS

The present application is a continuation of U.S. patent application Ser. No. 16/992,715 filed Aug. 13, 2020 (now U.S. Pat. No. 11,387,608), which claims priority to and the benefit of U.S. Provisional Patent Application No. 62/886,048, filed on Aug. 13, 2019, the entireties of which are incorporation herein by reference.

FIELD OF THE INVENTION

The present disclosure relates to an electrical wiring device with a flexible terminal for eliminating connection to ground.

BACKGROUND

Standards governing the operation of load control circuits (e.g., dimmers, switches, etc.) electric wiring devices prohibit current introduction on equipment grounding conductors during normal operation. In this context, the electrical wiring device must instead be connected to the neutral wire. The standards, however, provide an exception for load control circuits installed in retrofit applications. Thus, under industry standards, load control circuits can only draw current from grounding conductors in retrofit applications.

Providing separate electrical wiring devices for different applications (i.e., retrofit/non-retrofit) is cumbersome and inefficient, requiring consumers to know beforehand which product to purchase and increasing the required expertise and planning order to purchase the correct device. Accordingly, there exists a need in the art for a single electrical wiring device that permits selective contact with a ground circuit, allowing a consumer to select between providing as a reference for the load control circuit, an earth ground in retrofit applications or the neutral wire in non-retrofit applications.

BRIEF SUMMARY OF THE INVENTION

The various examples described in this disclosure can be combined in any technical way possible.

According to an aspect, an electrical wiring system providing selectable referencing to earth ground, includes a housing comprising a first terminal for attachment to HOT, a second terminal for attachment to LOAD, and a flexible terminal comprising a first leg mounted to the electrical wiring device and a second leg connected to the first leg via a flexible joint, wherein the relative distance between the first leg and the second leg is adjustable between an extended position and a retracted position by flexing the flexible joint, the flexible joint being biased in the extended position, wherein the first leg defines a first aperture and the second leg defines a second aperture, a load control circuit disposed within the housing and receiving a line input from the first terminal and a reference input, the reference input being referenced to the electric potential of the flexible terminal; and a screw having a screw head, the screw being inserted through the first aperture and the second aperture, the screw, at least in part, maintaining the first leg and second leg in fixed relation.

In an example, the electrical wiring system further includes a pressure plate having a threaded aperture, the threaded aperture being engaged with the threads of the screw, the pressure plate and the screw head being disposed on opposite sides of the flexible terminal such that advancing the pressure plate along the threads of the screw toward the head of the screw draws the flexible terminal from the extended position toward the retracted position.

In an example, one of the first aperture or second aperture is threaded.

In an example, the electrical wiring system further includes a grounding circuit.

In an example, the flexible terminal is positioned with respect to the grounding circuit such that adjusting the relative distance between the first leg and second leg away from the retracted position establishes contact between the grounding circuit and the second leg when the electrical wiring device is installed in a wall box.

In an example, the flexible terminal is positioned with respect to the grounding circuit such that adjusting the relative distance between the first leg and second leg toward the retracted position establishes contact between the grounding circuit and the second leg when the electrical wiring device is installed in a wall box.

In an example, the grounding circuit comprises one of a grounded frame or the wall box.

In an example, the grounding circuit comprises a ground wire.

In an example, the first leg is mounted to a PCB upon which the load control circuit is disposed.

In an example, the electrical wiring system further includes a terminal for attachment to neutral.

According to another aspect, an electrical wiring device providing selectable referencing to earth ground, includes a housing comprising a first terminal for attachment to HOT, a second terminal for attachment to LOAD, and a flexible terminal comprising a first leg mounted to the electrical wiring device and a second leg connected to the first leg via a flexible joint, wherein the relative distance between the first leg and the second leg is adjustable between an extended position and a retracted position by flexing the flexible joint, the flexible joint being biased in the extended position, wherein the second leg defines an opening dimensioned to receive a conductor of a neutral wire such that a force applied through insertion of the neutral wire presses the flexible terminal through a predetermined path toward the retracted position; and a load control circuit disposed within the housing and receiving a line input from the first terminal and a reference input, the reference input being referenced to the electric potential of the flexible terminal.

In an example, the opening is a slotted opening.

In an example, the slotted opening is defined by a first interior surface of a first arm of the second leg and by a second interior surface of a second arm of the second leg, the first arm and second arm each twisting such that, at a free end of the second leg, the first interior surface and the second interior surface face outward with respect to the housing, wherein the force applied through insertion of the neutral wire causes the slot to narrow such that the first interior surface and the second interior surface grasp a surface of the conductor of the neutral wire.

In an example, the electrical wiring device further includes a retaining lip arranged in the predetermined path of the second leg, the retaining lip comprising a ramped forward surface such that the distal end of the second leg is drawn across the ramped surface of the retaining lip as it progresses through the predetermined path and being captured behind a rear surface of the retaining lip, preventing the second leg from returning to the extended position.

According to another aspect, a method for selecting an electrical reference of an electrical wiring device, includes the steps of: adjusting a relative distance between a first leg and a second leg of a flexible terminal, the first leg and second leg being joined by a flexible joint, so as to isolate the second leg from a grounding circuit when the electrical wiring device is installed in a wall box, wherein a load control circuit disposed within a housing of the electrical wiring device is electrically referenced to an electric potential of the flexible terminal; and establishing contact between a neutral wire and the flexible terminal such that the load control circuit is electrically referenced to the neutral wire.

In an example, the method further includes adjusting the relative distance so as to isolate the second leg from the grounding circuit comprises increasing the relative distance between the first leg and the second leg.

In an example, the method further includes adjusting the relative distance so as to isolate the second leg from the grounding circuit comprises decreasing the relative distance between the first leg and the second leg.

In an example, the relative distance is maintained in fixed relation via a fastener.

In an example, the fastener is one of a screw, a clamp, or a sleeve.

In an example, the fastener comprises a screw and a pressure plate, the screw being inserted through a first aperture in the first leg and a second aperture in the second leg.

In an example, a head of the screw and the pressure plate are disposed on opposing sides of the flexible terminal.

In an example, the relative distance between the first leg and second leg is maintained in fixed relation through retaining the second leg against a retaining lip.

In an example, an electrical wiring device permitting selective reference to earth ground includes: a flexible terminal comprising a first leg and second leg being joined by a flexible joint such that a relative distance between the first leg and the second leg is adjustable to permit selective isolation from or contact with a grounding circuit when the electrical wiring device is installed in a wall box; and a load control circuit disposed within a housing of the electrical wiring device, the load control circuit electrically referenced to an electric potential of the flexible terminal.

In an example, the relative distance is maintained in fixed relation via a fastener.

In an example, the fastener is one of a screw, a clamp, or a sleeve.

In an example, the fastener comprises a screw and a pressure plate, the screw being inserted through a first aperture in the first leg and a second aperture in the second leg.

In an example, the neutral wire is grasped between the flexible terminal and the pressure plate.

In an example, a head of the screw and the pressure plate are disposed on opposing sides of the flexible terminal.

In an example, the fastener comprises a screw, the screw being inserted through a first aperture in the first leg and a second aperture in the second leg.

In an example, the flexible terminal comprises a slot within which the neutral wire can be received.

In an example, the electrical wiring device further includes a retaining lip, wherein the relative distance between the first leg and second leg is maintained in fixed relation through retaining the second leg against a retaining lip.

In an example, the flexible terminal is biased in an extended position.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 4A depicts a side view of a flexible terminal, a printed circuit board, and a grounded frame, according to an example.

FIG. 4B depicts a side view of a flexible terminal, a printed circuit board, a grounded frame, and a neutral wire, according to an example.

FIG. 11A depicts a perspective view of a flexible terminal, and a housing, according to an example.

FIG. 12 depicts a side view of a flexible terminal and a grounded frame, according to an example.

FIG. 13B depicts a perspective view of a flexible terminal, a housing, and a grounded frame, according to an example.

DETAILED DESCRIPTION OF THE INVENTION

Figure 1:
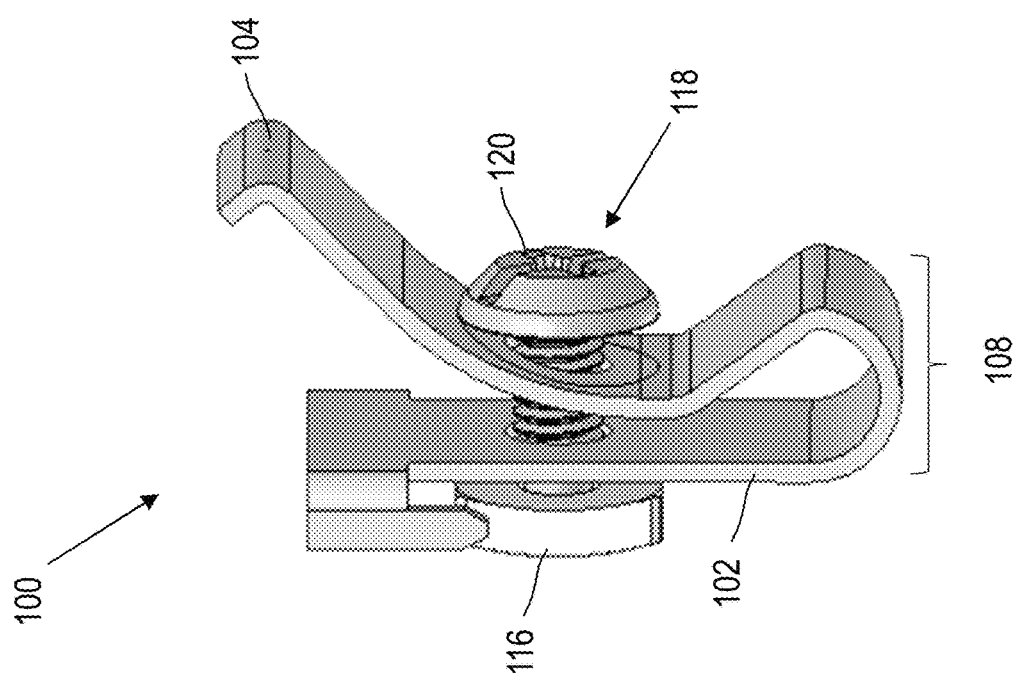
FIG. 1 depicts a perspective view of a flexible terminal, according to an example.

Referring to the figures there is shown in FIG. 1 a flexible terminal 100 that can be disposed on an electrical wiring device, permitting selective contact with a ground circuit in retrofit applications, and, conversely, selective removal of contact with a ground circuit in non-retrofit applications. By selectively contacting the flexible terminal 100 with a ground circuit, the installer of the electrical wiring device can thus elect to electrically reference the electrical wiring device to ground circuit in retrofit applications. Furthermore, flexible terminal 100 permits selective contact with a neutral wire. In this manner, flexible terminal 100 functions as a single-pole double-throw switch permitting the user to optionally select whether to reference the load control circuit to earth ground to the neutral wire.

Figure 2:
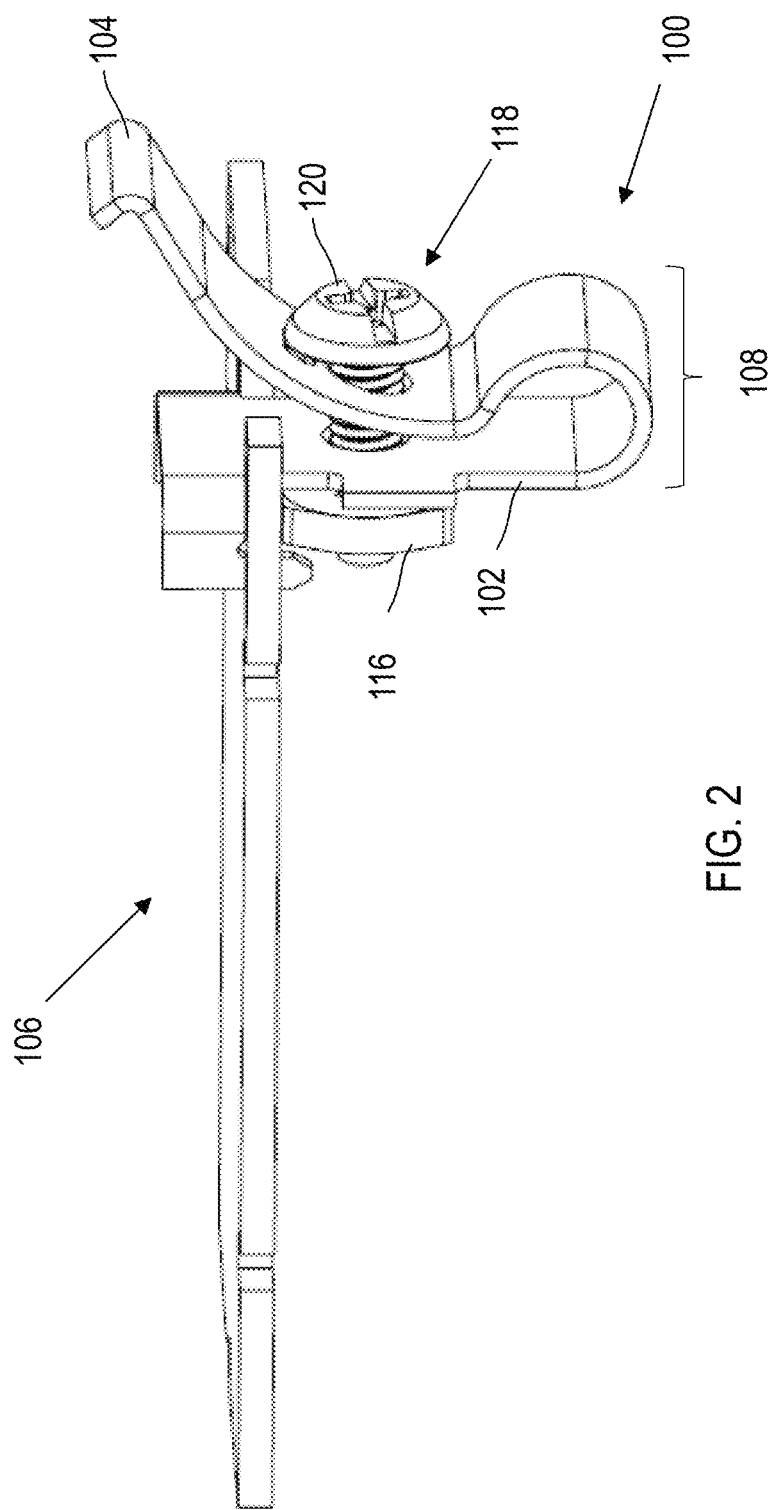
FIG. 2 depicts a perspective view of a flexible terminal and a printed circuit board, according to an example.

As shown in FIG. 1, the flexible terminal 100 comprises a first leg 102 and a second leg 104. As FIG. 2 shows, first leg 102 can be seated in the PCB 106 via, e.g., through-hole mounting (although any suitable mounting may be used), and can be in electrical communication with a load control circuit (e.g., a dimmer) disposed on the PCB 106, so as to provide a voltage reference (by either the connected ground circuit or the neutral wire) to the load control circuit. The second leg 104 extends from and is connected to the first leg 102 by way of a flexible joint 108, such that the first leg 102 and the second leg 104 can be drawn toward one another in a retracted position or away from one another in an extended position. In one example, such as shown in FIG. 4B discussed below, the first leg 102 and the second leg 104 can be drawn together such that they are in mutual contact. The ability to adjust the extension of the second leg 104 by flexing the flexible joint 108 permits the selective contact with the ground circuit.

Figure 3:
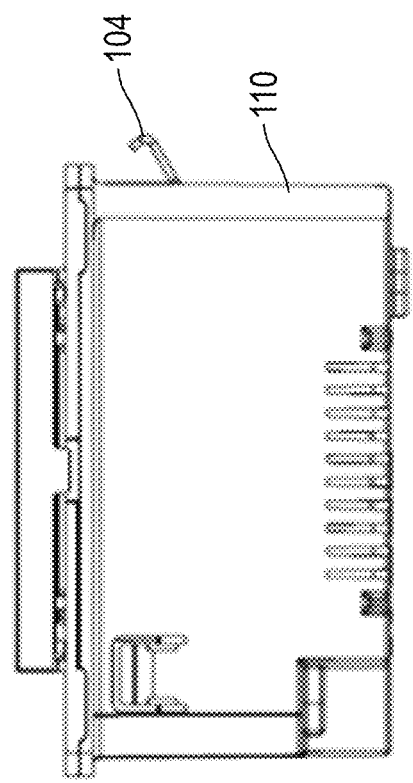
FIG. 3 depicts a side view of a housing and a flexible terminal, according to an example.

As shown in FIG. 3, second leg 104 extends away from a housing 110 of the electrical wiring device in which PCB 106 is disposed. When installed in conjunction with a wall box and/or frame, second leg 104 can extend away from the housing 110 so as to contact a ground circuit (such as a grounding wire or a grounding frame) or be drawn toward the housing such that the second leg 104 ceases to contact the ground circuit. It should be understood that, in various alternative examples, first leg 102 need not be mounted to PCB 106, but rather can be mounted to housing 110 or any structure disposed within housing 110. In these alternative examples, the circuit disposed on PCB 106 is still in electrical communication with and referenced to the electric potential of the first leg.

As described above, the relative distance between the first leg 102 and the second leg 104, and, consequently, the position of the second leg 104 with respect to the electrical wiring device (and the housing 110) can be adjusted by flexing the flexible joint 108. FIG. 4A depicts flexible terminal 100 as mounted on PCB 106 (with the housing 110 not shown) in contact with a ground circuit (in FIGS. 4A and 4B, the grounded frame 112) and FIG. 4B depicts flexible terminal 100 not in contact with a ground circuit. More particularly, FIG. 4A depicts the flexible terminal 100 in a position extended toward the extended position such that second leg 104 is in electrical contact with grounded frame 112, thereby referencing the load control circuit to earth ground. In the retracted position, as shown in FIG. 4B, the flexible terminal 100 is retracted toward PCB 106 thus isolating flexible terminal 100 from electrical contact with the grounded frame 112 and removing grounded frame 112 as the electrical reference. In its place, the neutral wire in the wall box is placed in electrical contact with first leg 102, thus referencing the load control circuit to the neutral wire. Thus, if a neutral wire 114 is available (e.g., during installations other than retrofitting a two-wire load control), the flexible terminal 100 is retracted from the ground circuit and placed in contact with the neutral wire; whereas, if a neutral wire is not available (e.g., retrofitting a two-wire load control) the flexible terminal 100 is placed in contact with the grounding circuit.

It should be understood that the retracted position refers to the position of maximum retraction, that is the position in which second leg 104 is drawn nearest to first leg 102. In some examples, in the retracted position, second leg 104 will be in contact with first leg 102, although this is not true of all examples. Furthermore, the extended position refers to the natural position of extension as enacted by the bias of flexible terminal 100. It should be understood that a range of positions exist between the retracted position and extended position.

As will be described in more detail below, the relative distance between the first leg 102 and second 104 can be maintained in fixed relation through a fastener or retaining lip. This permits retaining of the flexible terminal, after installation, in contact with the grounding circuit, or, alternately, isolated from the grounding circuit. In various examples described throughout this disclosure, a fastener can be, for example, a screw (with or without a pressure plate), a clamp, or a sleeve. Similarly, a retaining lip can be any surface within or without the housing 110 positioned to abut and restrain movement of second leg 104.

One such example of a fastener is shown in FIGS. 4A-4B as the combination of a pressure plate 116 and a screw 118 extending through a first aperture 122 in the first leg 102 and a second aperture 124 in the second leg 104. The pressure plate 116 and screw head 120 may be disposed on opposite sides of the flexible terminal 100 in order to impart the mechanical force on the flexible terminal 100. In other words, in an example, the screw 118 is inserted through the first aperture 122 and the second aperture 124 such that the screw head 120 is disposed at an outer surface of the second leg 104, whereas the pressure plate 116, which comprises a threaded aperture to receive the screw 118, can be disposed at the outer surface of the first leg 102. (In an alternative example, pressure plate 116 can be disposed at an outer surface of the second leg 104 and screw head 120 may be disposed at an outer surface of the first leg 102.) As shown in FIG. 4A, when the screw 118 and pressure plate 116 are apart (i.e., the pressure plate 116 is not advanced as far along the threads of the screw 118 toward screw head 120), the flexible terminal 100 is permitted to extend, according to the bias, toward or into the extended position such that it contacts grounded frame 112. Conversely, as shown in FIG. 4B when the screw 118 and pressure plate 116 are drawn together by advancing the pressure plate 116 along the threads of screw 118 toward screw head 120, second leg is retracted toward or into the retracted position, isolating flexible terminal 100 from contact with grounded frame 112. Screw 118 and pressure plate 116 thus function to maintain the first leg 102 and second leg 104 in fixed relation, and, more specifically, in a position which either contacts the grounding circuit or isolates the flexible terminal 100 from the grounding circuit.

As further shown in FIG. 4B, neutral wire 114 can be brought into electrical contact with flexible terminal by grasping neutral wire 114 between pressure plate 116 and first leg 102. Thus, in the example of FIG. 4B, where the electrical wiring device is installed in non-retrofit applications, neutral wire 114 and pressure plate 116 can be used to clamp neutral wire 114 against first leg 102, thus referencing the load control circuit to the neutral wire 114 rather than grounded frame 112. It should, however, be understood that, in alternative examples, neutral wire 114 can be placed in electrical contact with flexible terminal 100 in other ways. For example, neutral wire 114 can be positioned so that second leg 104 contacts it when being drawing into or toward the retracted position. In yet another example, electrical wiring device can include a dedicated neutral terminal, separate from flexible terminal 100, that can receive neutral wire when one is available. In this example, two terminals are provided, one for selectively contacting grounded frame 112 and the other for attachment of a neutral wire 114.

For the purposes of this disclosure, a screw is any threaded fastener with which the threaded aperture of pressure plate 116 can engage and be used to adjust the position of the second leg 104 with the first leg 102. It should further be understood that the mechanical force to either place the flexible terminal 100 in the retracted position or in the extended position may be implemented by any suitable fastener. For example, in an alternative example, as mentioned above, the mechanical force to draw the flexible terminal 100 into the retracted positioned position can be implemented by a clamp or sleeve, rather than a screw 118 and pressure plate 116.

Furthermore, in alternative examples, the flexible terminal 100 can be biased in the retracted position and may be drawn apart by a separator rather than a screw 118 and pressure plate 116. (In this example, there is no "extended position" as defined by the natural extension of flexible terminal 100 as enacted by a bias; rather the separator functions to extend the second leg away from the retracted position.) In one example, the separator can be implemented by a pressure plate, which is disposed between the first leg 102 and second leg 104, such that advancing the pressure plate along the threads away from the screw head 120 separates the first leg 102 and second leg 104.

The example described in connection with FIGS. 4A and 4B depict flexible terminal contacting grounded frame 112. This frame and the supporting structure is described in more detail in U.S. Pat. No. 10,103,530 B2, which is incorporated herein by reference in its entirety. Grounded frame 112, however, is only one example of a grounding circuit which flexible terminal 100 can contact. In other examples, as mentioned above, grounding circuit can be a grounding wire or other any grounded structure. In some examples, the grounding circuit can be part of a structure, such as grounded frame, that is sold or otherwise provided as part of an enclosure for the wiring device (e.g., a grounded wall box).

Furthermore, in alternative examples, the grounding circuit can be positioned with respect to the second leg 106 such that second leg is brought into contact with grounding circuit by retracting the second leg 106 toward or into the retracted position and out of contact with the grounding position by extending the second leg 104 toward or into the extended position (or beyond the extended position in the example in which a separator is used).

Figure 5A:
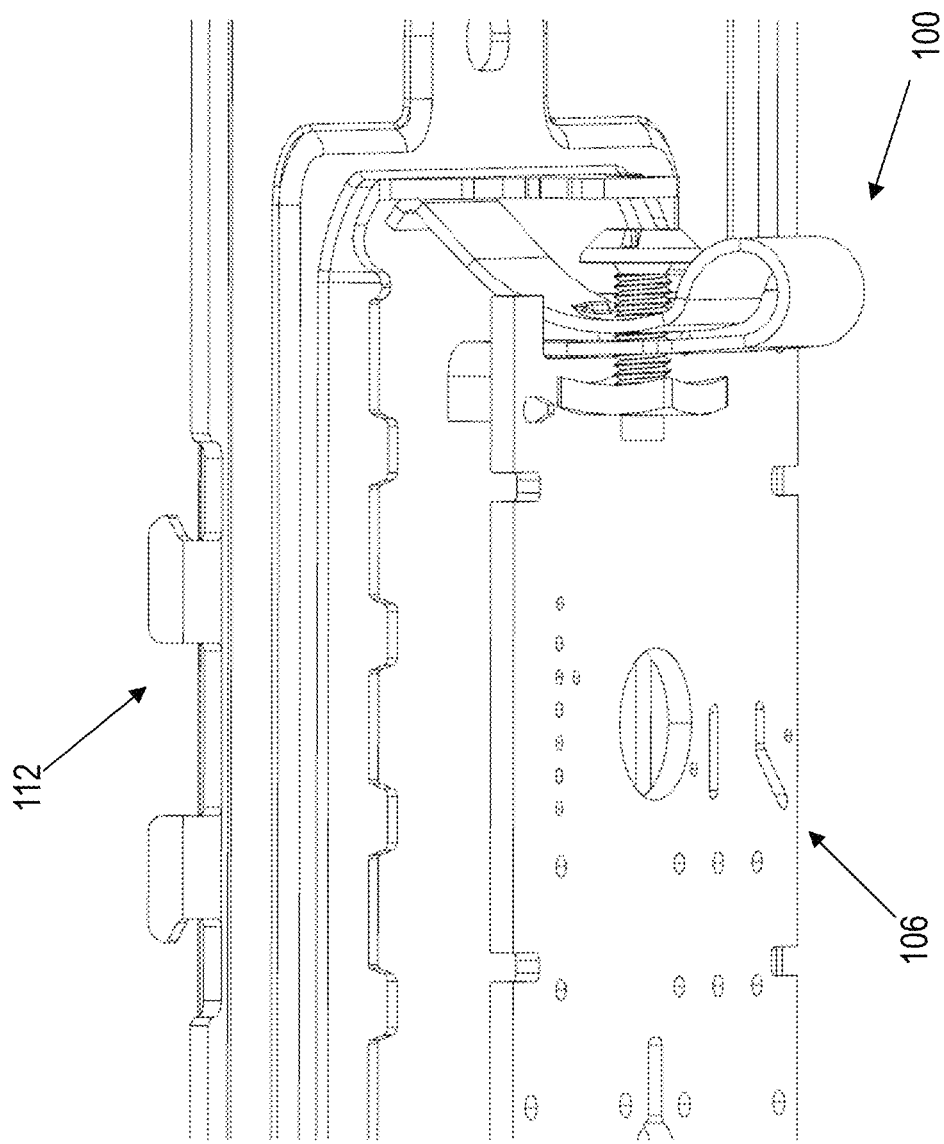
FIG. 5A depicts a perspective view of a flexible terminal, a printed circuit board, and a grounded frame, according to an example.
Figure 5B:
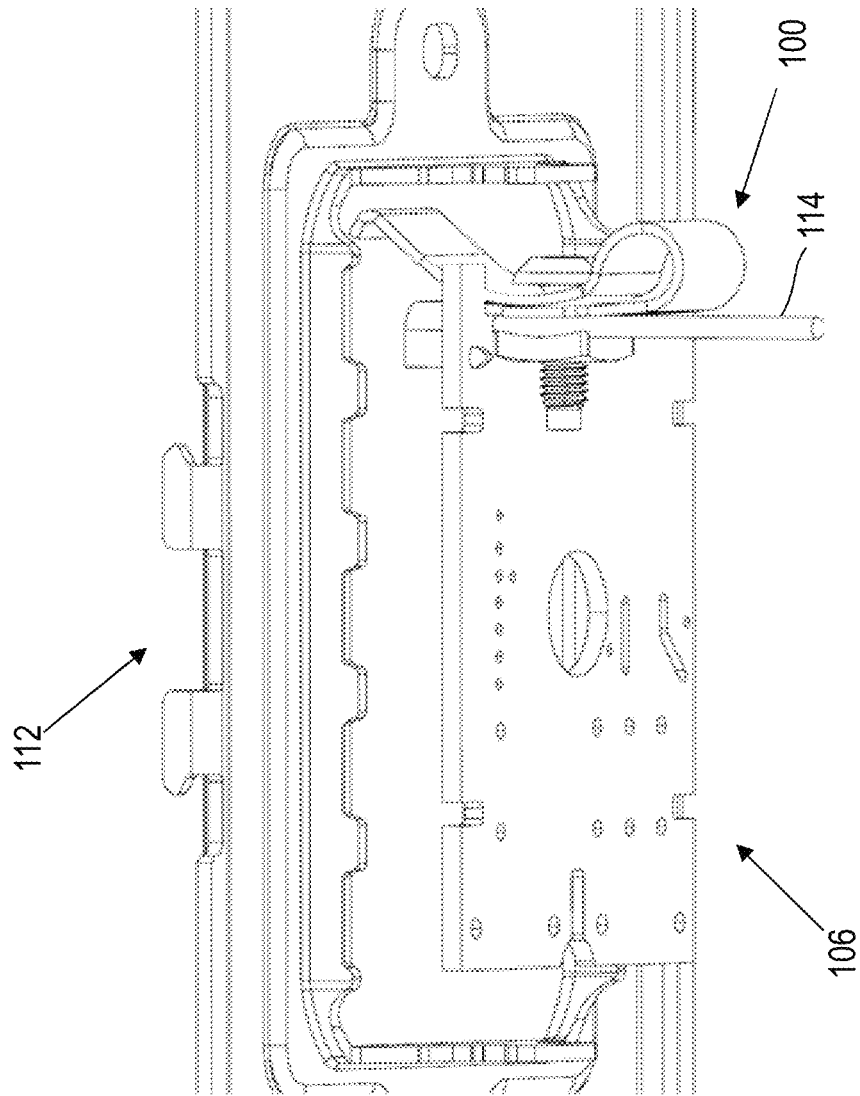
FIG. 5B depicts a perspective view of a flexible terminal, a printed circuit board, a neutral wire, and a grounded frame, according to an example.

As shown in FIG. 4B, flexible terminal 100 can be shaped to permit the opposing surfaces disposed about first aperture 120 and second aperture 124 to be in mutual contact without stressing the flexible joint 108. This can be provided by fashioning the second leg 104 as, such that, in the retracted position, the second leg 104 features a lower portion that extends toward the first leg 102 from the flexible joint 108. This portion of the second leg 104 can take a variety of forms. For example, in FIG. 4A-4B, this lower portion of the second leg extends in a substantially straight length from arc of the flexible joint toward the first leg 102; whereas in FIG. 5 this lower portion forms a smooth arc from the flexible joint 108 toward the first leg 102.

Figure 6:
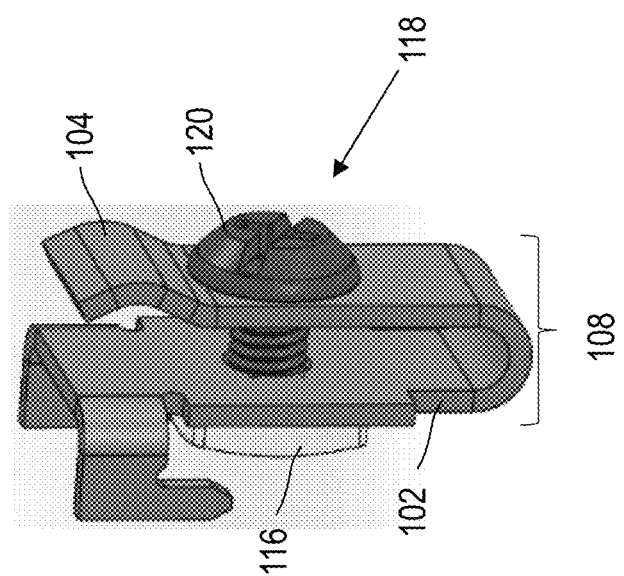
FIG. 6 depicts a perspective view of flexible terminal, according to an example.
Figure 7:
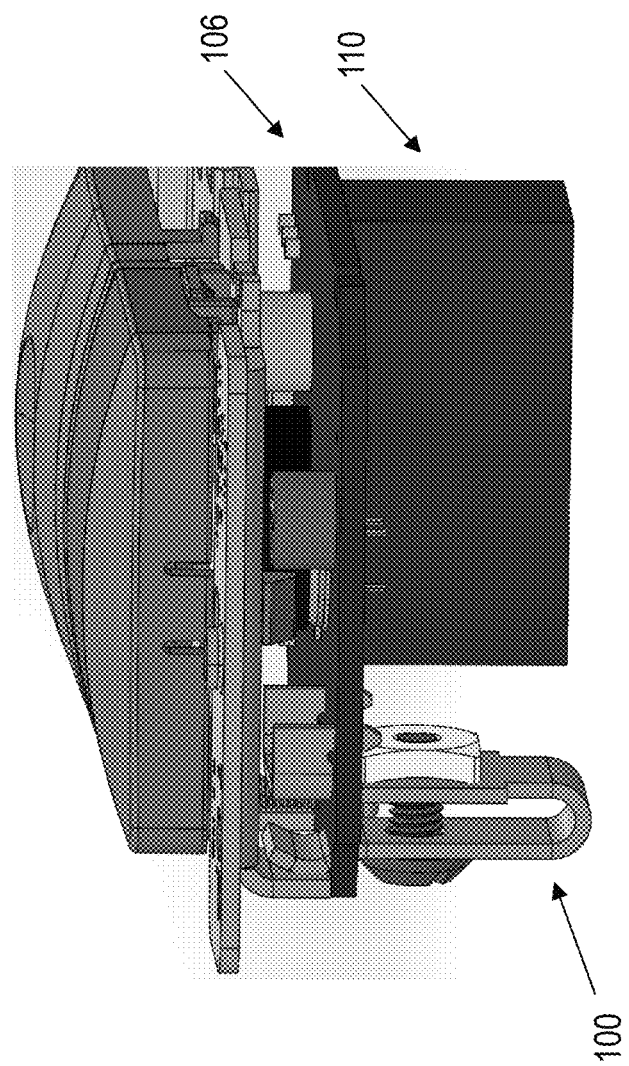
FIG. 7 depicts a perspective view of a flexible terminal, a housing, and a printed circuit board, according to an example.

FIGS. 6-9 depict alternative examples of flexible terminal 100. FIGS. 6-7 depicts an alternative flexible terminal 100, in which the lower portion of second leg 104 is not arced toward first leg 102, but rather is planar, such that, in the extended position the first leg 102 and the second leg 104 are parallel with each other.

Figure 8:
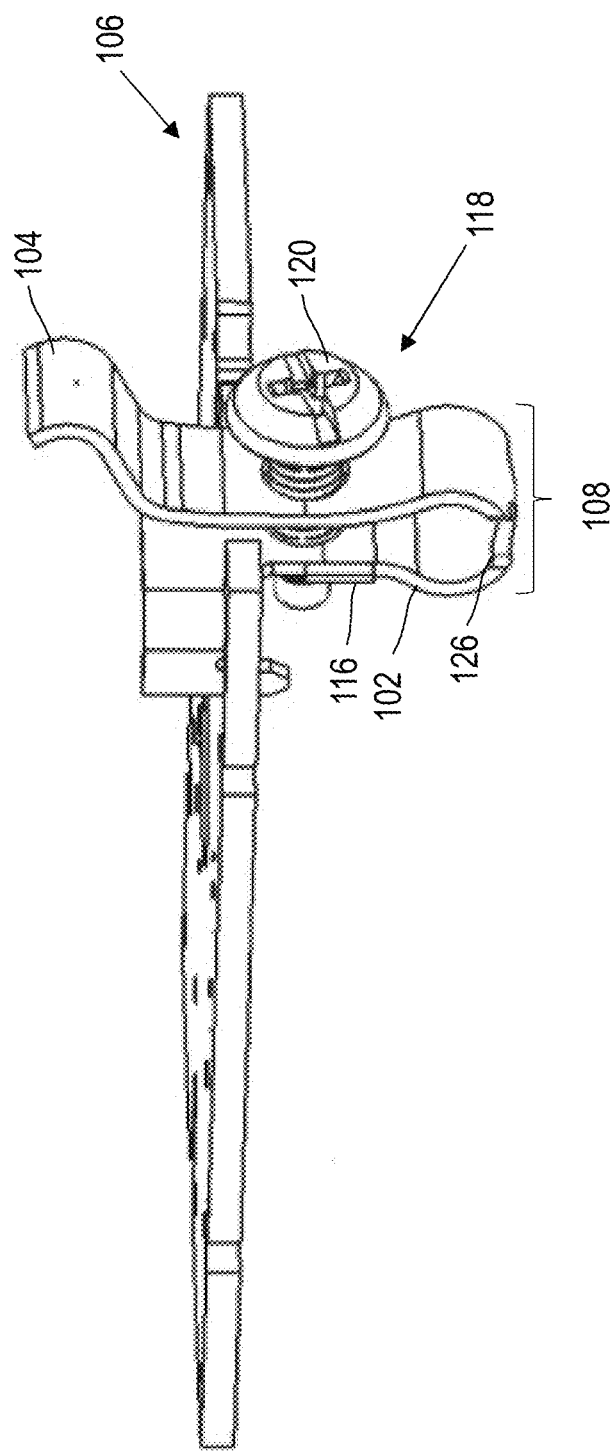
FIG. 8 depicts a perspective view of a flexible terminal and a printed circuit board, according to an example.
Figure 9:
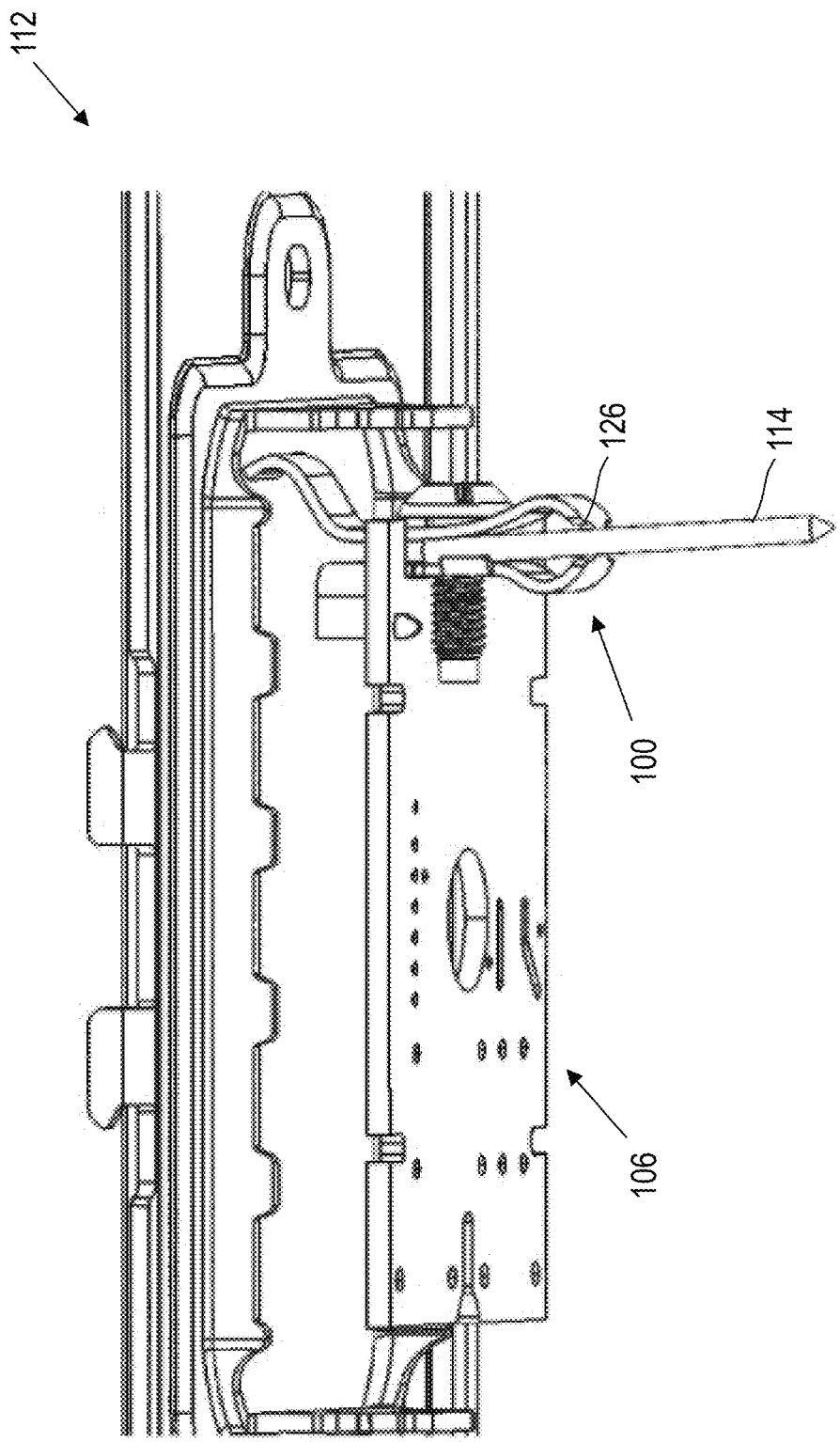
FIG. 9 depicts a perspective view of a flexible terminal, a printed circuit board, a neutral wire, and a frame, according to an example.

In the example of FIGS. 8-9 flexible terminal 100 includes a slot 126 located within the flexible joint 108 permitting the insertion and grasping of neutral wire 114 for when the second leg is disconnected from the grounding circuit in non-retrofit applications. Furthermore, the example of FIGS. 8-9 omits the pressure plate, and instead employs threading of the first aperture to permit the screw, through advancement along the threads, to draw the flexible terminal into the retracted position or, conversely, to permit it to open into the extended position. The threading of the first aperture, together with screw 118, in this example, functions to maintain a fixed relation between first leg 102 and second leg 104.

Figure 10:
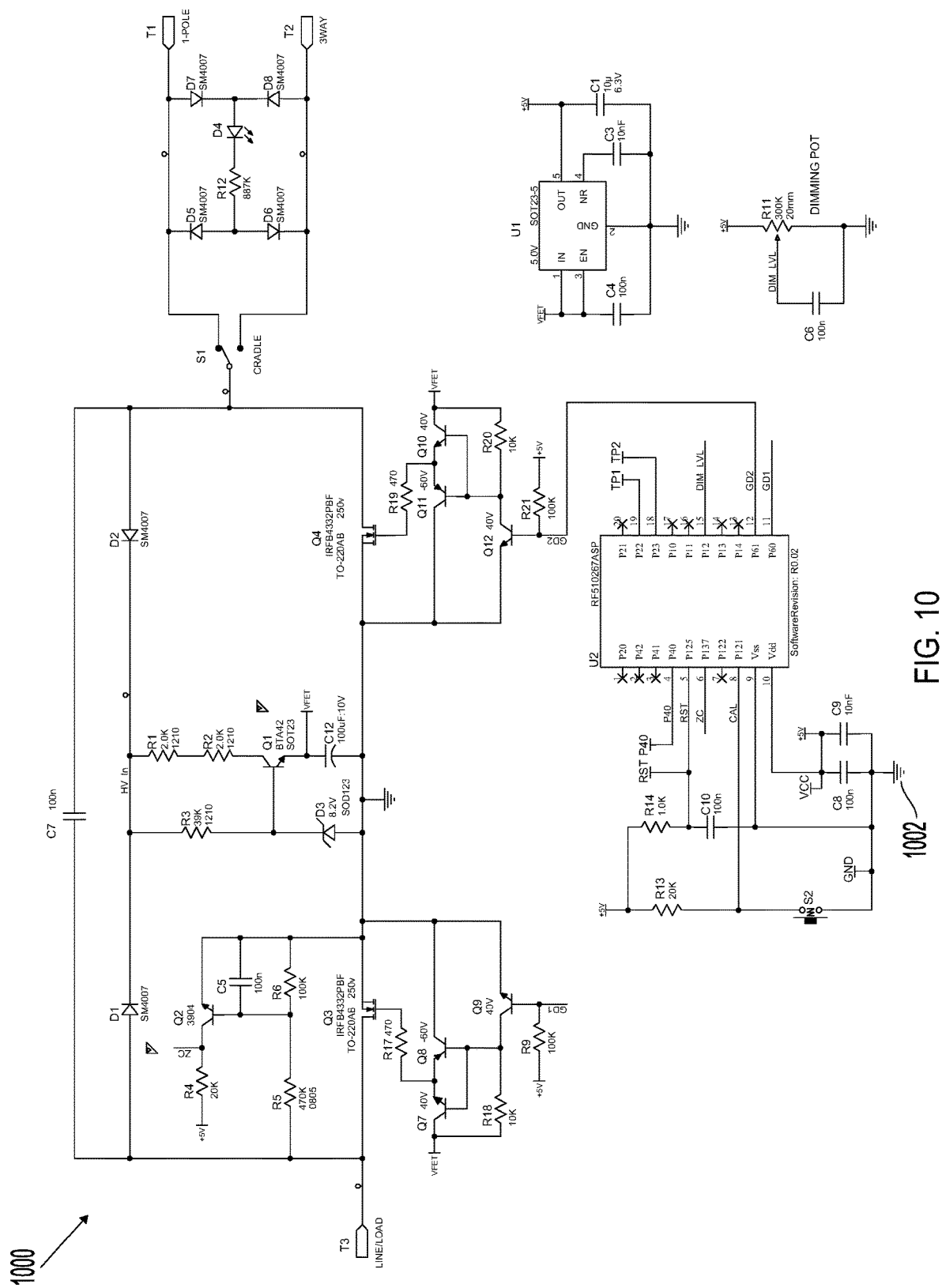
FIG. 10 depicts a schematic view of a load control circuit, according to an example.
Figure 11B:
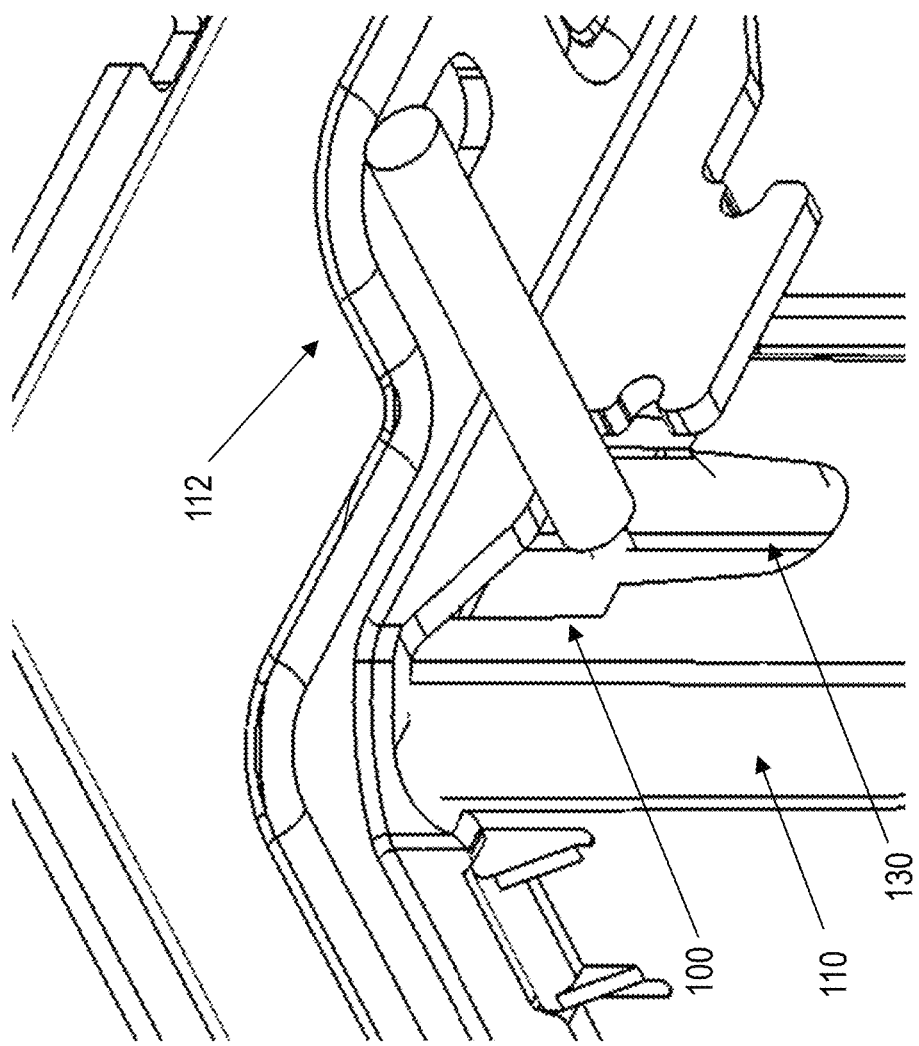
FIG. 11B depicts a perspective view of a flexible terminal, a housing, a neutral wire, a grounded frame, according to an example.

FIG. 10 depicts an example load control circuit 1000—a 2-wire dimmer—which can alternately be referenced to earth ground or neutral, depending on the context. HOT can be connected to T3 (labeled LINE/LOAD) and load can be connected to T1 or T2; alternatively, HOT can be connected to T1/T2 and load can be connected to T3. As described above, ground is either the neutral wire in normal contexts, or the connected grounding circuit in retrofit applications. In this example, ground 1002 is used to draw less than 0.5 mA to power the microcontroller in the dead times of the output waveform, i.e., when the load is not drawing power.

It should be understood that the circuit of FIG. 10 is only one example and that load control circuit disposed on the PCB may be any suitable load control circuit. Furthermore, it should be understood that the flexible terminal 100 may be used in connection with other types of circuits besides load control circuits (e.g., GFCI circuits, switches, dimmers, lighting controls). Indeed, the flexible terminal may be used in connection with any type of circuit for which it is advantageous to selectively contact one of two (or more) reference points.

FIGS. 11-14 show an alternative example of flexible terminal 100, which includes an aperture 128 dimensioned to receive the conductive portion of the neutral wire 114. In this example, as shown in FIG. 11A, flexible terminal 100 is biased in an extended position, a portion of the second leg 104 extending from the housing such that it contacts the grounding circuit (here, grounded frame 112). To isolate flexible terminal 100 from contact with the grounding circuit, as shown in FIG. 11B (in perspective view) and FIG. 12 (in side view, without housing 110 shown), the conductive portion of the neutral wire 114 is inserted through and contacts the inner surface of the aperture 130. Because the aperture 130 is only dimensioned to receive the conductor of neutral wire 114—that is, its width is greater than the diameter of the conductor but less than the diameter of the insulation—continuing to press the neutral wire toward the interior of the housing will press the second leg 104 toward the retracted position, simultaneously breaking contact with the grounded frame 112 and establishing contact with the neutral wire 114.

Figure 13A:
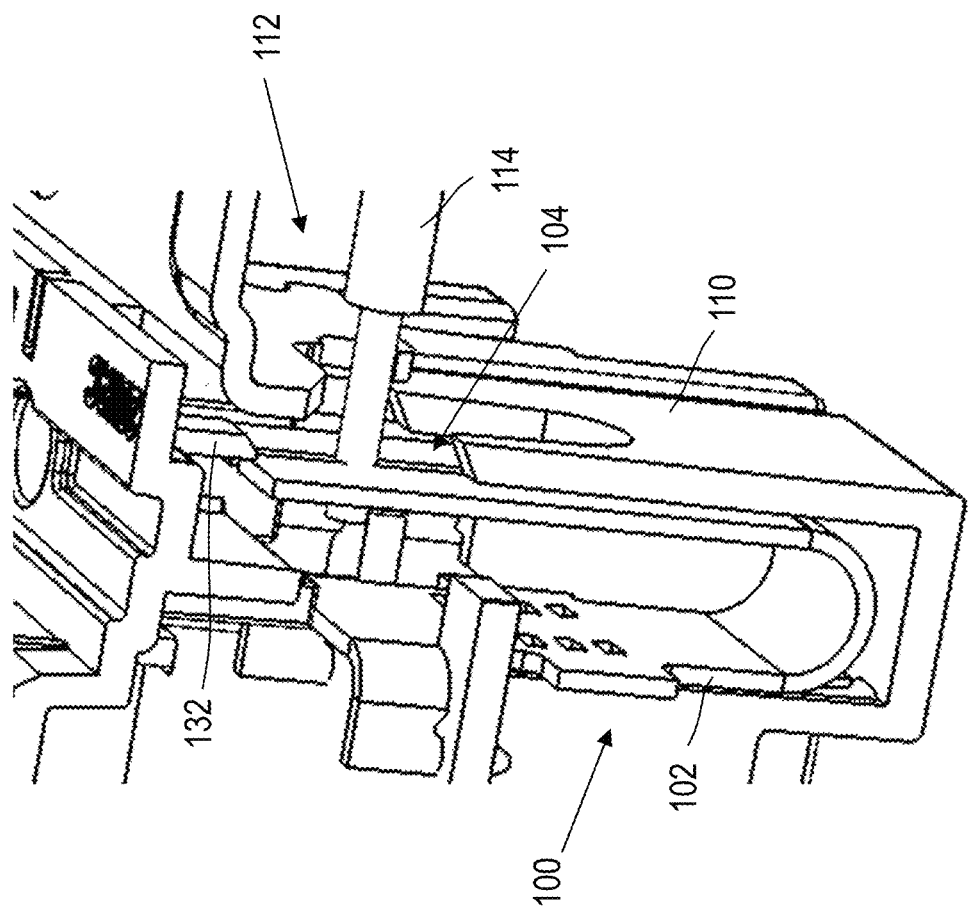
FIG. 13A depicts a perspective view of a flexible terminal, a housing, a neutral wire, and a grounded frame, according to an example.
Figure 14A:
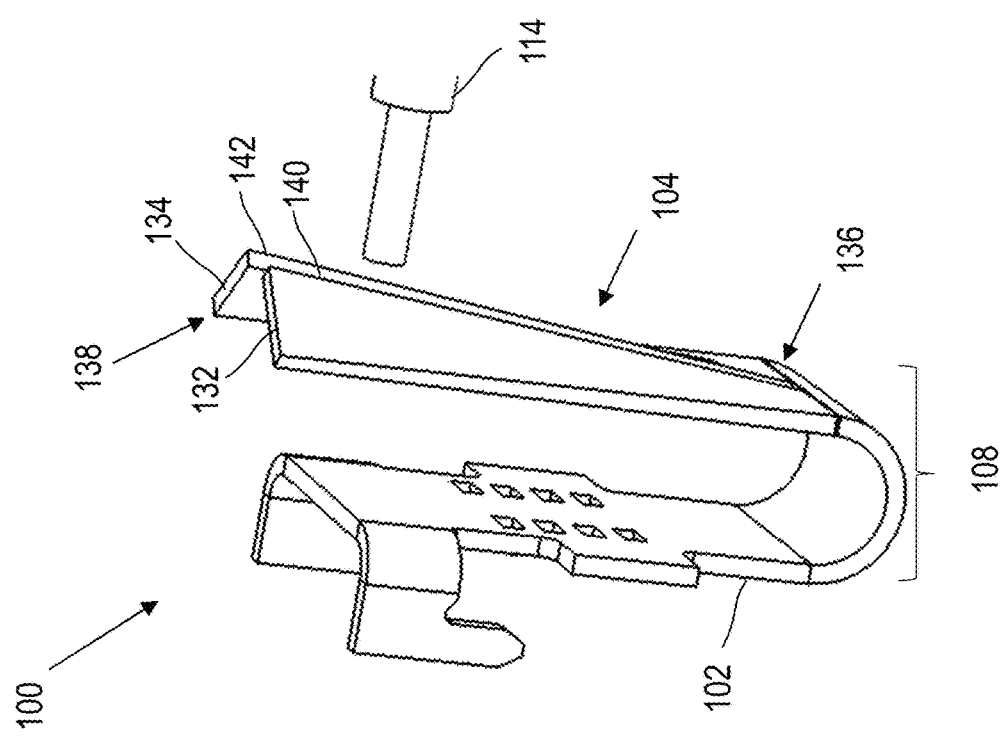
FIG. 14A depicts a perspective view of a flexible terminal and a neutral wire, according to an example.
Figure 14B:
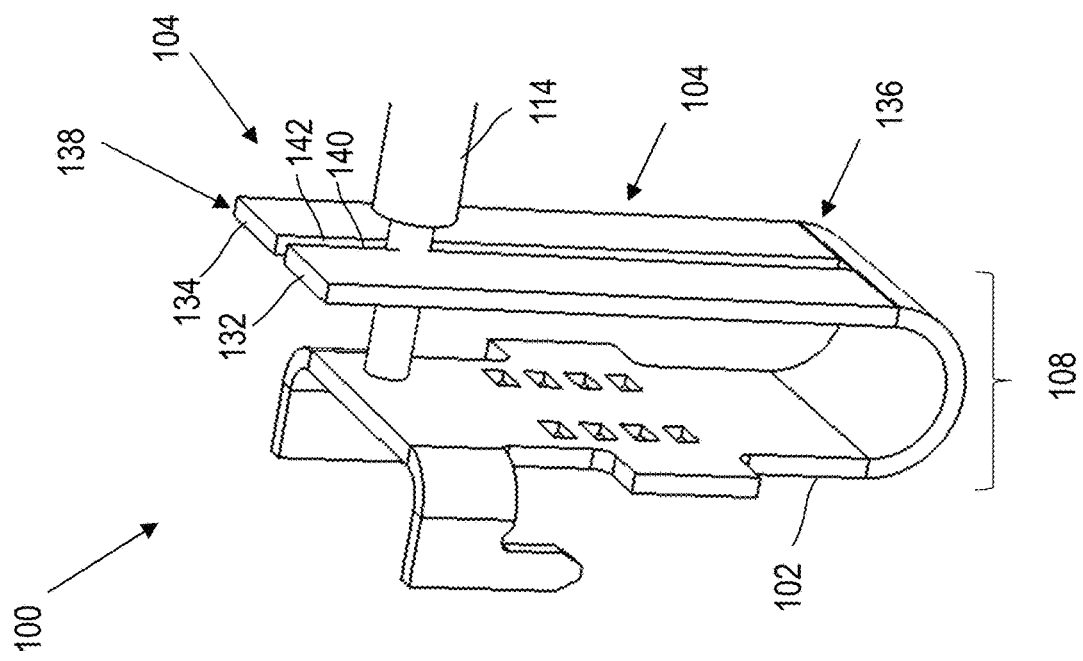
FIG. 14B depicts a perspective view of a flexible terminal and a neutral wire, according to an example.

Further, as shown in FIGS. 13A and 13B, a retaining lip 132 can be disposed within the housing 110. The retaining lip 132 is positioned in the path of the free end 138 of the second leg 104. The retaining lip 132 can include a ramped forward surface 133, which free end 138 of the second leg 104 is drawn across as it moves toward the retracted position. Once the free end 138 of the second leg moves beyond the retaining lip 132, it is prevented from returning toward the extended position, where it would again contact the grounding circuit, by the flat rear surface 135 of the retaining lip 132. As a result, the flexible terminal 100 is prevented from assuming contact with the grounding circuit. (It should be understood that retaining lip 123 can assume any shape and be positioned any location suitable for (at the user's selection) abutting and restraining second leg 104, and, consequently terminal 100, from contacting the grounding circuit.

While, in various examples, the aperture can assume any suitable shape for establishing contact with the neutral wire 114, as shown in FIGS. 11-14 aperture 130 can be formed by a slot between arms 132 and 134 formed in second leg 104. As shown in FIGS. 14A and 14B (in which housing 110 and grounded frame 112 are not shown for the purpose of clarity), arms 132 and 134 twist outward from the fixed end 136 of second leg 104 toward the free end 138, such that the interior surfaces 140 and 142 of the two arms 132 and 134, respectively, face outward with respect to the housing 110 at the free end 138 of the second leg 104. For the purposes of this disclosure, the fixed end 136 refers to the end of arms 132 and 134 that is fixed to the flexible joint 108 or to the remainder of the second leg 104, and the free end refers to the end of arms 132 and 134 opposite the fixed end 136.

As the neutral wire 114 presses the second leg 104 toward the retracted position, the arms 132 and 134 untwist due to the force of the neutral wire on interior surfaces 140 and 142, drawing interior surfaces 140 and 142 inward with respect to the housing and narrowing slotted aperture 130. As a result of the narrowing of the slot, the interior surfaces 140 and 142 of the first arm 132 and second arm 134 grasp the neutral wire. Thus, when implemented with the retaining lip 132, the effect is that the neutral wire is inserted into the slotted aperture 130 and used to press the second arm behind the retaining lip 132, locking the second leg 104 in a position toward the retracted position and firmly grasping the neutral wire such that it does not easily come loose after installation.

In an alternative example, second leg 104 can be implemented without an aperture for receiving the neutral wire 114, and simply be manually pressed behind retaining lip 132 for retaining the second arm toward the retracted position where the second arm 104 will not contact the grounding circuit.

It should be understood that the slotted aperture 130 of FIGS. 11-14 is only one type of aperture that can be defined in second arm 104. In alternative examples, the aperture 130 can be circular or any other suitable shape for receiving the neutral wire. Furthermore, the twisting of the arms 132 and 134 of second leg 104 function to grasp the neutral as they are turned inward and effect a narrowing of the slot; however, other methods of grasping or otherwise retaining the neutral wire can be implemented.

It should be understood that, because the example of FIGS. 1-9 and 11-14 depict a unitary flexible terminal 100, the lines that distinguish first leg 102, flexible joint 108, and second leg 104 from each can vary. It is not necessary that the structures of these sections be perfectly defined. Indeed, as can be seen in FIGS. 1-9 and 11-14 the relative shapes of the first leg 102, second leg 104, and flexible joint 108 can vary between examples. Rather, what is required by these descriptions are two portions that can be drawn toward or away from each other by flexible a portion that connects them, the first portion being mounted to the electrical wiring device and the second portion that can be selectively contacted to the grounding circuit by flexing the flexible portion.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring system providing selectable referencing to earth ground, comprising:
   a housing comprising a first terminal for attachment to HOT, a second terminal for attachment to LOAD, and a flexible terminal comprising a first leg mounted to an electrical wiring device and a second leg connected to the first leg via a flexible joint, wherein the relative distance between the first leg and the second leg is adjustable between a first position and a second position by flexing the flexible joint,
   a load control circuit disposed within the housing and receiving a line input from the first terminal and a reference input, the reference input being referenced to the electric potential of the flexible terminal; and
   a fastener disposed to retain the first leg and the second leg in fixed relation.

2. The electrical wiring system of claim 1, wherein the fastener is one of a screw, a clamp, or a sleeve.

3. The electrical wiring system of claim 1, wherein the first position is an extended position.

4. The electrical wiring system of claim 1, wherein the first position is a retracted position.

5. The electrical wiring system of claim 1, wherein the flexible joint defines a slot dimensioned to receive a wire, such that the wire, extending through the slot, can be grasped between the first leg and second leg.

6. The electrical wiring device of claim 1, wherein the fastener is a screw having a screw head, wherein the first leg defines a first aperture and the second leg defines a second aperture, the screw being inserted through the first aperture and the second aperture, the screw, at least in part, maintaining the first leg and second leg in fixed relation.

7. The electrical wiring device of claim 6, further comprising a pressure plate having a threaded aperture, the threaded aperture being engaged with the threads of the screw, the pressure plate and the screw head being disposed on opposite sides of the flexible terminal such that advancing the pressure plate along the threads of the screw toward the head of the screw decreases the relative distance between the first leg and the second leg.

8. The electrical wiring device of claim 6, wherein one of the first aperture or second aperture is threaded.

9. The electrical wiring device of claim 1, further comprising a grounding circuit.

10. The electrical wiring system of claim 9, wherein the flexible terminal is positioned with respect to the grounding circuit such that increasing the relative distance between the first leg and second leg establishes contact between the grounding circuit and the second leg when the electrical wiring device is installed in a wall box.

11. The electrical wiring system of claim 9, wherein the flexible terminal is positioned with respect to the grounding circuit such that decreasing the relative distance between the first leg and second leg establishes contact between the grounding circuit and the second leg when the electrical wiring device is installed in a wall box.

12. The electrical system of claim 9, wherein the grounding circuit comprises one of a grounded frame or a wall box.

13. The electrical system of claim 9, wherein the grounding circuit comprises a ground wire.

14. The electrical wiring system of claim 1, wherein the first leg is mounted to a PCB upon which the load control circuit is disposed.

15. The electrical wiring system of claim 1, further comprising a terminal for attachment to neutral.

* * * * *